3,150,176
THIOPHOSGENE
William M. Foley, Jr., Berkeley, Calif., assignor to Stauffer Chemical Company, New York, N.Y., a corporation of Delaware
No Drawing. Filed May 29, 1961, Ser. No. 113,140
7 Claims. (Cl. 260—543)

This invention relates to a method of producing thiophosgene by the dehalogenation of perchloromethyl mercaptan. The present process differs over the prior art in that the dehalogenation of perchloromethyl mercaptan is effected by reaction with white phosphorus to form thiophosgene and phosphorus trichloride.

The prior art dictates various processes for the production of thiophosgene. One known method is the treating of carbon tetrachloride at high temperatures with sulfur-containing reducing agents. Examples of such reducing agents are iron sulfide, sulfur, and phosphorus sulfides.

The reduction of perchloromethyl mercaptan with either hydrogen sulfide or iron to form thiophosgene is also known. The reduction with iron may be expressed as follows:

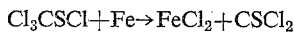

$$Cl_3CSCl + Fe \rightarrow FeCl_2 + CSCl_2$$

Still other known methods of producing thiophosgene include the reaction of perchloromethyl mercaptan and organic reducing agents.

The present invention differs over the known prior art in that phosphorus is used to effect the desired dehalogenation of perchloromethyl mercaptan. Furthermore, phosphorus has proved superior to the reagents previously employed to dehalogenate perchloromethyl mercaptan in that the yields are greater and more uniform than when other inorganic reagents are used and phosphorus is more economical than the organic reagents previously employed.

Thus, from the foregoing discussion, it is obvious that the objects of the present invention include a more economical process for the production of thiophosgene using starting materials not taught by the prior art wherein high yields and more uniform results are obtained. Other and further objects of the present invention will become apparent from the discussion to follow.

According to the present invention, perchloromethyl mercaptan is reacted with white phosphorus to form thiophosgene as represented in the following equation.

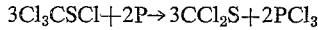

$$3Cl_3CSCl + 2P \rightarrow 3CCl_2S + 2PCl_3$$

In this reaction, perchloromethyl mercaptan and white phosphorus are mixed in near stoichiometric quantities and fed to a reaction zone. In the reaction zone the near stoichiometric quantities of the reactants are heated to effect the above stated reaction. The resulting products of the thiophosgene and phosphorus trichloride are then removed from the reaction zone and separated.

The process of the present invention may be carried out as either a batch process or a continuous process. In a batch process, near stoichiometric quantities of the reactants are merely placed in a reactor and heated or refluxed until the reaction is completed. Thereafter, the products are separated from any unreacted material and the thiophosgene recovered.

In a continuous process, perchloromethyl mercaptan and white phosphorus are continuously fed to a reactor in approximately stoichiometric proportions. The reactor can be of any material, such as glass or the like, which will not interfere with the desired reaction. In the reactor, the reactants are continuously refluxed. The reflux temperature would be maintained between 73.5° C. and approximately 145° C. By maintaining such a temperature in the reaction zone, the products, thiophosgene and phosphorus trichloride, are vaporized or distilled off as they form. The vaporized reaction products are then conducted to a reflux condenser wherein they are continuously condensed and collected. The collected thiophosgene and phosphorus trichloride are then separated by any method known to those skilled in the art. Examples of such methods are (1) hydrolysis of the phosphorus trichloride to phosphorus acid which separates from the thiophosgene as an upper layer which, in turn, may be poured off to leave pure thiophosgene, and (2) chlorination of the phosphorus trichloride to phosphorus pentachloride which separates from the thiophosgene as a solid.

As shown by the foregoing discussion, no catalyst is needed in the present process. However, addition of a catalytic amount of iodine to the reaction zone increases the yield considerably.

The yields of the present process may also be increased by addition of an inert high boiling hydrocarbon solvent, such as chlorobenzene or mineral spirits or other inert high boiling diluents, to the reaction zone which renders the reaction more controllable.

The following discussion regards an example of a typical laboratory set-up to effect the reaction of the present invention as a continuous process. In this case, perchloromethyl mercaptan and molten white phosphorus of near stoichiometric quantities are placed in a mixing apparatus. The mixing apparatus typically could be a glass container having a continuously operating mixing device which suspends the white phosphorus evenly in the perchloromethyl mercaptan solution and which is also equipped with a feed device for charging the reactor with reactants. The reactor can be a glass container in which the fed reactants are refluxed. Under reflux, the fed reactants change from a pale yellow oily liquid to a deep red color which indicates that the reaction is taking place and thiophosgene is being formed. The reactor temperature is maintained above the boiling point of the reaction products which is about 73.5° C. and below the boiling point of perchloromethyl mercaptan which is 149° C. By using a temperature in this range, the reaction products are continuously distilled off and are conducted to a reflux condenser where the vapors are condensed and collected. The separation of the reaction products is then effected by conventional means.

Throughout the disclosure, the present invention has been discussed as occurs at atmospheric pressure. Other pressures may be used in the present reaction with the result that lower pressures will lower the temperature range and higher pressures will raise the temperature range as would be obvious to those skilled in the art.

*Example 1*

Perchloromethyl mercaptan (1859 g.) was added to a three-liter pear shaped addition flask equipped with a stirrer and then the system was swept out with dry nitrogen. Phosphorus (220 g.) was then added to the perchloromethyl mercaptan which was then heated until the phosphorus melted and a slurry was formed by stirring. The slurry was maintained at 50° C. The reactor used in this example was a five liter flask fitted with an inlet from the addition flask, a short vacuum jacketed fractionating assembly with a receiver and cold trap, and a solvent addition funnel. The main reactor, which contained 250 ml. of chlorobenzene and 10 grams of iodine, was heated to 130° C. and the addition of phosphorus-perchloromethyl mercaptan slurry was started. After the reaction started an additional 250 ml. of chlorobenzene was added through the addition funnel and the rate of addition of the reactants was regulated by the capacity of the fractionating assembly.

The formed thiophosgene was separated from the crude reaction mixture by hydrolysis, dried and fractionated. The yield was 91% for this run.

*Example 2*

This run was made in the same reactor as indicated in Example 1 supra. The amounts of reaction materials and catalyst were the same. However, in this run no solvent was used. Instead 100 ml. of perchloromethyl mercaptan was added to the main reactor at start up. The yield for this run was 87.8%.

Thiophosgene has utility as an intermediate in making numerous chemical compounds and is also useful as a fumigant.

I claim:

1. A process for the preparation of thiophosgene comprising reacting at a temperature of at least 73.5° C. white phosphorus and approximately a stoichiometric amount of perchloromethyl mercaptan and recovering the thiophosgene thus formed.

2. A process for the preparation of thiophosgene comprising: reacting white phosphorus and approximately a stoichiometric amount of perchloromethyl mercaptan at a temperature at which the thiophosgene formed exits the reaction zone as a gas.

3. A process for the preparation of thiophosgene comprising: reacting white phosphorus and approximately a stoichiometric amount of perchloromethyl mercaptan in the presence of a catalytic amount of iodine at a temperature above the boiling point of the thiophosgene thus formed so as to boil off and collect the thiophosgene produced in the reaction zone.

4. A process for the preparation of thiophosgene comprising: reacting approximately stoichiometric amounts of white phosphorus and perchloromethyl mercaptan in the presence of an inert high boiling organic solvent at a temperature above the boiling point of thiophosgene and collecting the thiophosgene thus formed.

5. A process as stated in claim 4 wherein the inert high boiling organic solvent is selected from the group consisting of chlorobenzene and mineral spirits.

6. A process for the preparation of thiophosgene comprising: reacting approximately stoichiometric amounts of white phosphorus and perchloromethyl mercaptan in the presence of a catalytic amount of iodine and an inert high boiling organic solvent at a temperature above the boiling point of thiophosgene and collecting the thiophosgene thus formed.

7. A process as stated in claim 6 wherein the inert high boiling organic solvent is selected from the group consisting of chlorobenzene and mineral spirits.

References Cited in the file of this patent

UNITED STATES PATENTS

| | | |
|---|---|---|
| 2,668,853 | Orwoll | Feb. 9, 1954 |
| 2,861,103 | Lukes | Nov. 18, 1958 |

OTHER REFERENCES

Remy: "Treatise on Inorganic Chemistry," vol. 1, page 626 (1956).